Dec. 11, 1956 N. J. RANNEY 2,773,519

BARB WIRE MANUFACTURE

Filed Aug. 31, 1951 9 Sheets-Sheet 1

INVENTOR
NEIL J. RANNEY
By Hooper, Leonard & Glenn
his attorneys

INVENTOR
NEIL J. RANNEY
By Hoopes Leonard & Glenn
his attorneys

Dec. 11, 1956 N. J. RANNEY 2,773,519

BARB WIRE MANUFACTURE

Filed Aug. 31, 1951 9 Sheets-Sheet 3

INVENTOR
NEIL J. RANNEY
By Hooper Leonard & Glenn
his attorneys

INVENTOR
NEIL J. RANNEY
By Hooper Leonard & Glenn
his attorneys

INVENTOR
NEIL J. RANNEY
By Hoopes Leonard & Glenn
his attorneys

INVENTOR
NEIL J. RANNEY
By Hooper Leonard & Glenn
his attorneys

INVENTOR
NEIL J. RANNEY
By Cooper, Leonard & Glenn
his attorneys

INVENTOR
NEIL J. RANNEY
By
Horpes Leonard & Glenn
his attorneys

Dec. 11, 1956 N. J. RANNEY 2,773,519

BARB WIRE MANUFACTURE

Filed Aug. 31, 1951 9 Sheets-Sheet 9

INVENTOR
NEIL J. RANNEY
By Fraser, Leonard & Glenn
his attorney

United States Patent Office 2,773,519

Patented Dec. 11, 1956

2,773,519

BARB WIRE MANUFACTURE

Neil J. Ranney, Euclid, Ohio, assignor to Wean Equipment Corporation, Euclid, Ohio, a corporation of Ohio Application August 31, 1951, Serial No. 244,608

8 Claims. (Cl. 140—60)

This invention relates to the manufacture of barb wire and comprises a number of features of improvement in apparatus and methods for the fabrication of barb wire.

I have embodied the invention so far as the apparatus aspects are concerned in apparatus for making barb-wire fencing out of individual strands of wire. The method aspects of my invention may be practiced on such apparatus. I shall accordingly describe the invention as embodied generally in a machine for making barb-wire fencing, which machine is susceptible of use in carrying out my improved methods.

I provide means for delivering a plurality of line wires to a common point, means for forming a barb around at least one of said line wires at said point, means adjacent said point for intermittently advancing the wire from the barb-forming means and coiling and twisting means rotating about a common vertical axis for twisting the line wires and forming a coil of the finished wire. The barb may be formed of one or more wires delivered to a point transversely of the line wires depending upon the type and size of barb desired on the wire. The number of line wires commonly used in the manufacture of barb wire is two and the apparatus has been illustrated as delivering two line wires to the point where the barb is formed.

Following the barb-forming operation, means are provided adjacent the delivery point intermittently drawing the line wires away from said point a distance equal to the desired spacing of barbs on the line wires. Preferably the means for drawing the lines wires combines a positive gripping mechanism carrying the wires at a substantially constant speed and eccentric mechanism intermediate the constant speed delivery means and the barb-forming means which alternately draws the wire from the barb-forming means a distance equal to the distance between the barbs on the line wires and gradually releases the wire to return and draw the wire another distance equal to the barb spacing on the line wires. Coiling and twisting means are provided following the means for intermittently drawing the wires away from the barb-forming position. The coiling and twisting means are rotatable about a common vertical axis whereby to twist the line wires one about another and subsequently to coil the twisted wires upon a spool.

My machine preferably comprises means for delivering a plurality of line wires to a common point and means for delivering and twisting one or more transverse wires about one or more of the line wires to form barbs. Each of the wires for forming a barb is advanced from a feeding mechanism substantially transversely of the direction of travel of the line wire and in proximity to the line wires at the aforesaid common point of delivery so that its free end thereof projects beyond the line wires. The free end of the transverse wire projects a sufficient distance beyond the line wires to allow for twisting it about the line wires and still have a remaining untwisted portion projecting beyond the line wires to form one of the barbs. After the barb has been formed on the line wires by the twisting operation, the end of the wire projecting from the feeding mechanism is cut off a sufficient distance from the line wires to form a second barb. Generally the cut is made at an oblique angle to the length of the wire so as to form a sharp projecting point. Preferably the line wires are advanced in step-by-step fashion, each step being equal to the distance between the barbs. The transverse barb-forming wires are simultaneously brought into position with respect to the line wires so that both line wires and barb-forming wires stop or "dwell" at a common point, during which "dwell" the barb-forming wires are twisted about the line wires and then severed from the wire remaining in the barb-forming wire feeding mechanism to form a projecting barb.

The machine preferably includes, in addition to the mechanism for delivering the line wires and barb-forming wires and for twisting and cutting the barbs, a cooperating mechanism for advancing the line wires in step-by-step fashion through the barb-forming operation while at the same time substantially continuously and uninterruptedly feeding the line wires with barbs attached thereto to a twisting and coiling mechanism for completing the wire-forming operations and delivering completed coils of barb wire at working height so that they may be quickly drawn out on end to a conveyor.

The strands of wire used in making both the line wires and the barbs may be taken from spools or swifts as desired. The means employed for handling either spools or swifts prior to the entry of the wire into the means for delivering line wires and barb wires to a common point are well known and accordingly have not been shown in the drawings. The drawings, accordingly, show the wires only from the time they enter the machine.

In my preferred apparatus the line wires are delivered to a common point substantially parallel to each other and spaced apart from each other a distance sufficient to permit the barb-forming wire to pass between them if desired. This is accomplished by passing the line wires through spaced apart parallel wire guides which straighten the wires and space them from one another. In the apparatus shown in the drawings two line wires are shown delivered in a horizontal direction one above the other and the barb-forming wire or wires is or are delivered at an intermediate horizontal level between the two line wires or above or below the line wires as desired. Since the line wires are advanced through the barb-forming mechanism in step-by-step fashion while at the same time it is desirable that they be subsequently twisted one about another and coiled at a substantially continuous and uninterrupted rate, I have provided means, as mentioned above, for intermittently advancing the line wires through the barb-forming mechanism and at the same time delivering them to the twisting and coiling means at a substantially continuous and uninterrupted rate. I have accomplished this by providing an eccentrically moving slack take-up wheel in conjunction with a continuously moving wire gripping and transferring wheel.

I provide a novel twisting and coiling mechanism for completing the wire and coiling it on the spool. In a preferred form the mechanism comprises a yoke which is rotatable about a vertical axis, means delivering the wire with barbs attached thereto to a point in line with the axis of the yoke and a coiling member rotatable coaxially with the yoke. The line wires passing from the delivery means to the rotating yoke are twisted one about another and then directed to the rotating coiling member by a traversing head or "butterfly" guide on the yoke. The weight of the traversing head is counterbalanced by placing the drive for the coiling member in a position diametrically opposed to the traversing head on the opposite side of the yoke.

The rotating coiling member is provided with a turntable and an axially retractable arbor retractable below the level of the turntable so that a spool placed upon the turntable can be held or released by raising or lowering the arbor. The movement of the arbor is preferably controlled by hydraulic means and the flow of hydraulic fluid is controlled by solenoid operated valves in the usual manner. A counter may be and usually is provided to automatically stop the entire mechanism including the barb-forming and wire-advancing means when the desired amount of wire has been coiled on a spool.

In order to form the barb about the line wires I provide an axially slidable constantly rotating sleeve surrounding the wire guides and having a pair of pins projecting from one end parallel to the line wires as they leave the wire guides. Means are provided to move the sleeve axially around the wire guides in timed relation to the movement of the line wires and transverse wires and thereby bring the projecting pins into the path of the transverse wires to turn them about the line wires the desired distance and then to withdraw the pins to release the transverse wires.

In order to deliver the transverse barb-forming wires in proper timed relation and of sufficient length to form the bars I provide a feeding mechanism connected to the drive for the slack take-up wheel and the continuously moving wire-gripping and transferring wheel. The feeding mechanism comprises, in its preferred form, feed rolls and wire guides on opposite sides of the line wires to deliver barb-forming wires across the path of the line wires. In order to cut the barb-forming wire at the end of the twisting operation I provide a vertically movable shear plate which cooperates with the wire guides to shear the wires at an oblique angle to their line of travel thereby forming a point on the wire end.

I have attempted to point out particular features of my invention and their advantages but have not attempted to detail each and every one of the novel features thereof. Other details, features and advantages of my invention will become apparent from the following description of a present preferred embodiment thereof.

In the accompanying drawings I have shown a present preferred embodiment of apparatus including the above-outlined apparatus features and have illustrated a present preferred method of practicing its features in which.

In order to facilitate understanding of the operation of the apparatus and method I have divided the operations into steps, each of which will be discussed below with reference to the drawings.

*Delivering the wire*

Figure 1:
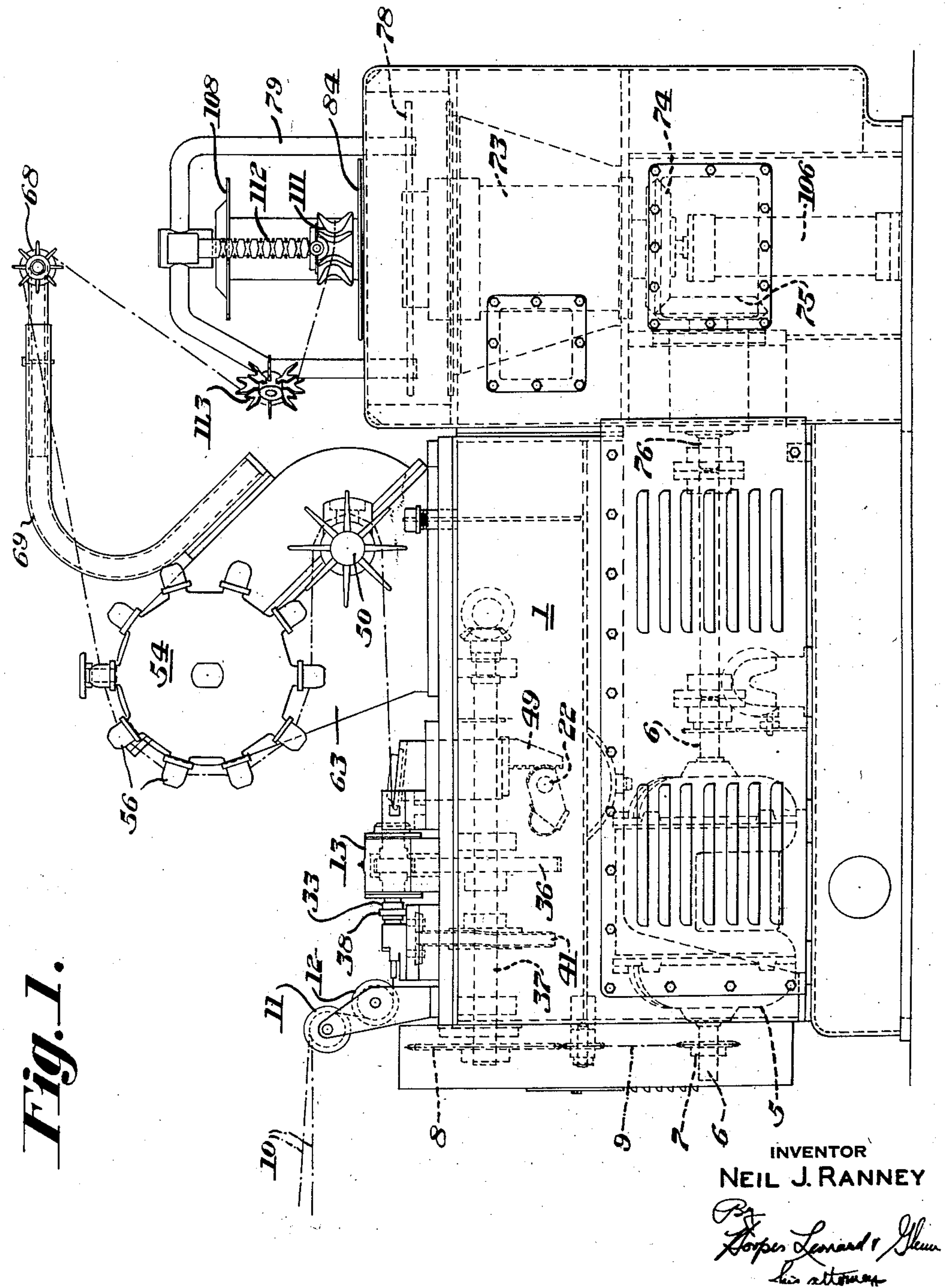
Figure 1 is a side elevation of an apparatus according to my invention for the manufacture of barb wire including the delivery means, the barb-forming means, the wire-advancing means and the coiling and twisting means.
Figure 2:
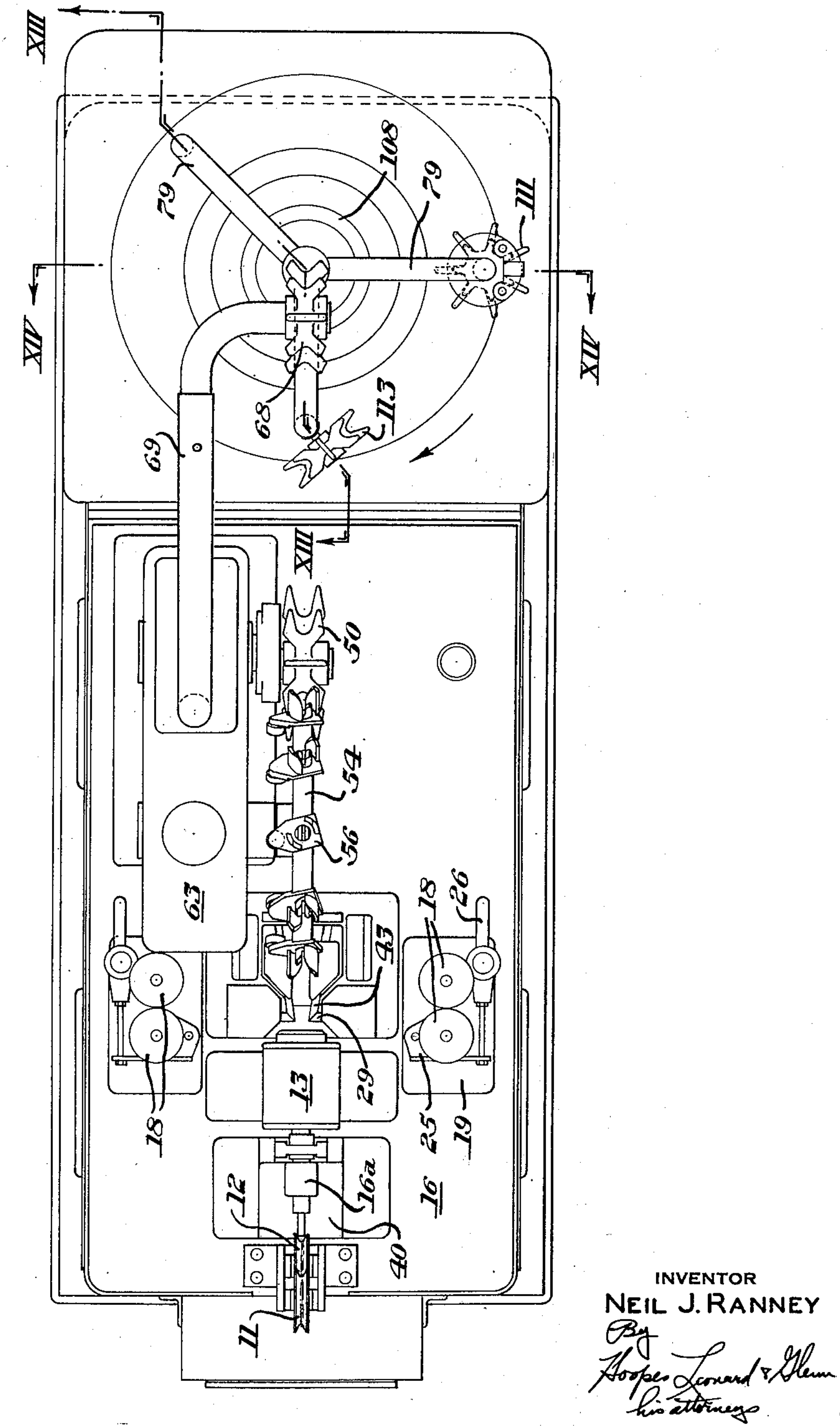
Figure 2 is a top plan view of the machine shown in Figure 1.

Referring now in particular to the drawings, there are provided four spools or swifts (not shown) carrying bundles of wire used in the manufacture of barb wire. Wires from two of these swifts are carried to the entry sheaves 11 and 12 at the entry side of the apparatus (the left side viewing Figure 1) to form line wires 10 upon which the barbs will subsequently be placed. From the pulleys or sheaves 11 and 12 the line wires pass in substantially parallel side-by-side relationship in a common vertical plane transverse to the center of the delivery mechanism generally indicated as 13. From the entry pulleys or sheaves 11 and 12 the line wires are threaded through a wire guide in the form of a shaft 14 having two parallel slots **14*a* which run the entire length of the shaft 14 and through which the line wires are threaded. The shaft 14 is firmly held in an outer sleeve 15 which surrounds the shaft 14 with the exception of projecting end portions 14*b* and 14*c* at either end of the shaft. The sleeve 15 is fastened to the frame 16*a* by a locking key 16*b* which fits into a slot in the circumference of the sleeve. Both the wire guide 14 and the sleeve 15 are thereby held against rotation in the frame 16*a***.

Figure 3:
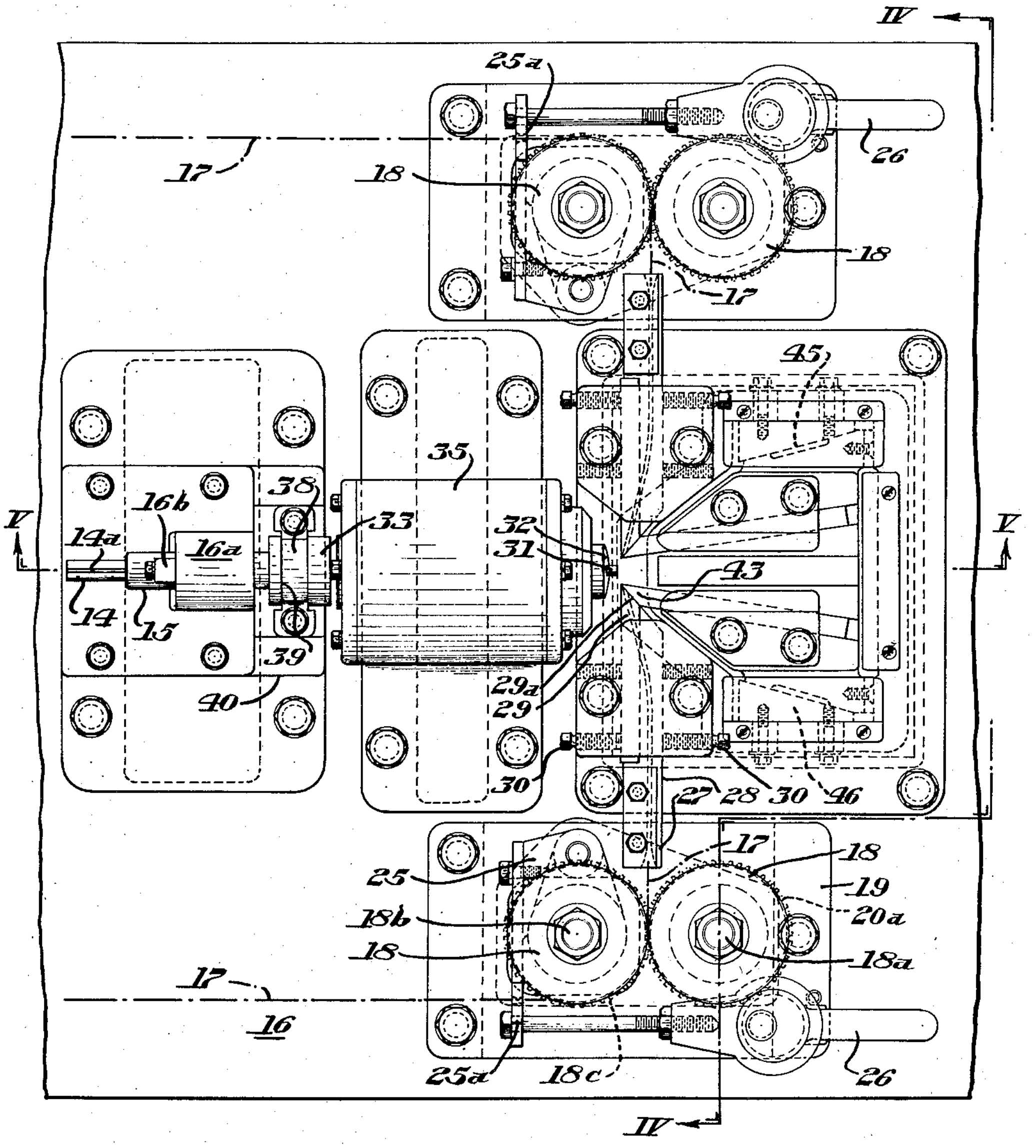
Figure 3 is a top plan view of the wire-delivery means and barb-forming means.
Figures 4, 6, 9:
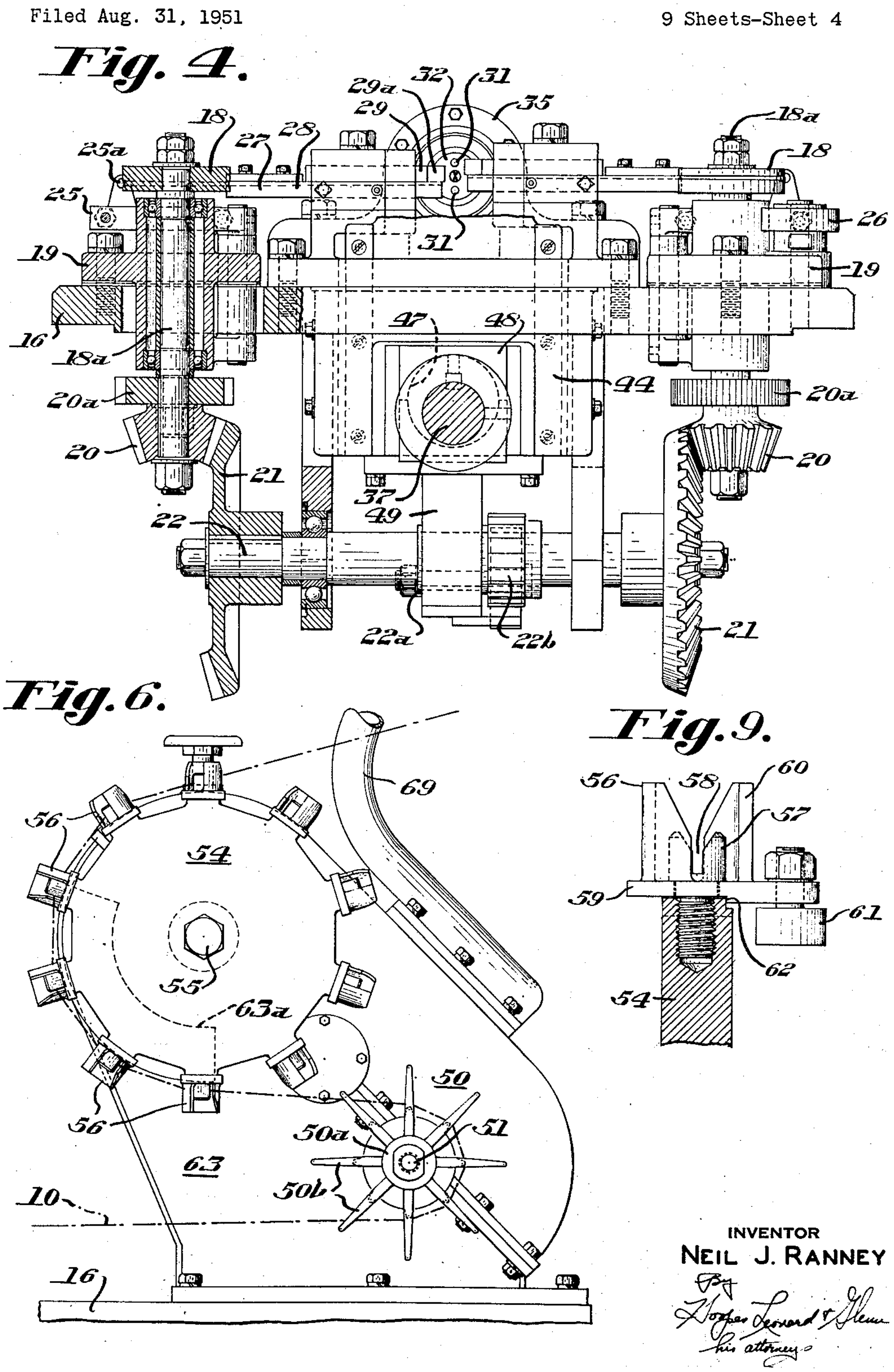
Figure 4 is a section on the line IV—IV of Figure 3.
Figure 6 is an enlarged elevational view of the wire take-up wheel and the wire-gripping wheel.
Figure 9 is an enlarged view partly in section and partly in elevation of a wire guide and gripping mechanism.
Figure 5:
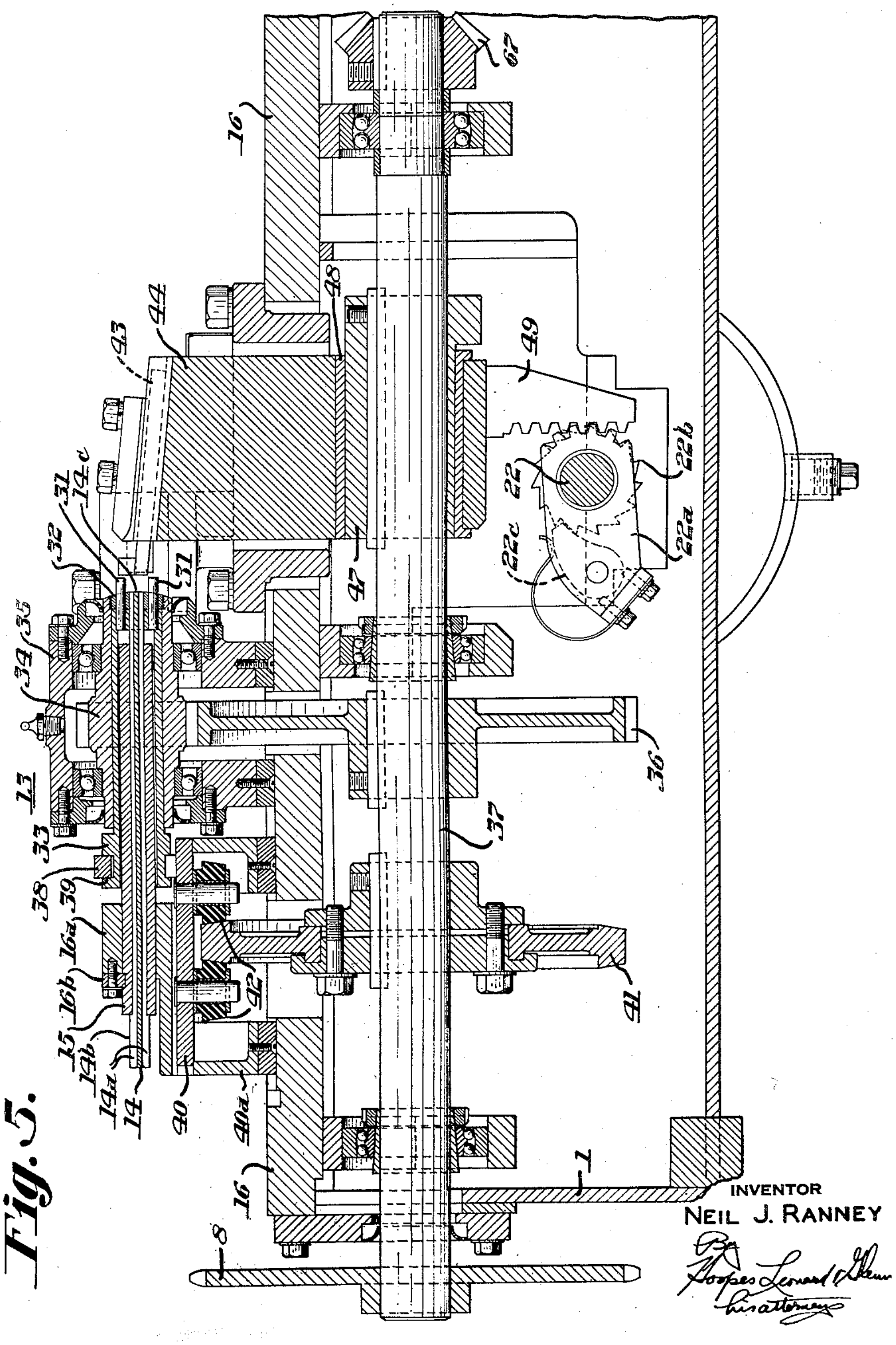
Figure 5 is a section of the line V—V of Figure 3.

The barb-forming wires 17 are taken from the two remaining swifts previously mentioned. These swifts are not shown in the drawings. The two barb-forming wires 17 enter the machine from opposite sides through wire guides **25*a*, as shown in Figures 3 and 4, on a line parallel to the path of travel of the line wires 10. The barb-forming wires are gripped between pairs of opposed feed rolls 18 which pinch or grip the wires between them and feed them in a direction transverse to the path of travel of the line wires 10. One of the feed rolls 18 is fixed on a shaft 18*a* which is journaled for rotation in a housing 19 firmly fastened to the frame 16 of the machine. This roll shaft 18*a* is provided with a beveled gear 20 which is driven by a second beveled gear 21 mounted on a shaft 22 rotatable in the frame 16 on a line transverse to the line of roll shaft 18*a*. The shaft 22 is driven by a pinion segment 22*a* and ratchet 22*b* mounted thereon as shown in Figure 5. The operation of this drive will be described in more detail hereafter. The other feed roll 18 of the pair of feed rolls is mounted on a shaft 18*b* journaled for rotation in a movable plate 25 mounted on the feed roll carrying housing 19. (This roll is driven by a spur gear 18*c* mounted on the shaft 18*b* and engaging a second spur gear 20*a* on the driven shaft 18*a*). An eccentric dog 26 on the plate 19 is provided to move the movable plate 25 toward and away from the driven feed roll 18 so as to move the two rolls apart or bring them together as desired. In this way the feed rolls are readily movable toward or away from each other in order to permit threading the wire into the wire guide 27** which delivers the barb-forming wire transversely to the line wires.

The wire guide 27 is mounted on the frame 16 and is made up of a lower guide plate 28 and an upper guide plate 29. The upper guide plate acts as one of the severing plates to be used in cutting off the wire after a barb has been formed on the line wires. In order to form the point which is desired on each barb, the upper guide plate is made with a beveled end **29*a* at the angle desired on the barb point. The relative position of the guide plates is adjustable by means of set screws 30**.

*Forming the barb*

The two line wires 10 are delivered from the end of the wire guide 14 adjacent the ends of the barb-forming wire guides 27. Sufficient barb-forming wire 17 is automatically fed through the wire guides 27 by the rotating feed rolls 18 and across the path of travel of the line wires 10. One of the barb-forming wires is preferably passed through between the two line wires 10 and the other is passed below the line wires. This is possible by reason of the difference in elevation of the line-wire guides and the two barb-forming wire guides (see Figure 4). Such an arrangement permits formation of a four-point barb. With the wires in this position the barb is formed about the line wires. This is accomplished by two coiling or twisting pins 31 mounted in the end of a rotatable coiling sleeve 33, which is movable parallel to the path of the line wires and transverse to the path of the barb-forming wires so that the pins 31 come into contact with the barb-forming wires when the sleeve 33 and the pins 31 are rotated about the line wires.

The pins 31 pass through a pair of parallel openings in the cap 32 which is rotatable about the delivery end of the wire guide 14 and is fastened in the end of a rotatable coiling gear 34 which rotates about the stationary wire guide sleeve 15. The coiling sleeve 33 is keyed to a coiling gear 34 by means of the engagement of the pins in the openings in cap 32 and is slidable therein parallel to the line of travel of the line wires. The coiling gear 34 is journaled for rotation in a journal box 35 fastened to the frame 16 of the apparatus. The coiling gear 34 and the sleeve 33 keyed thereto are rotated about the wire guide sleeve 15 by a pinion gear 36 mounted on the main drive shaft 37 which extends longitudinally of the apparatus. As the coiling gear 34 rotates about the wire guide 14 it carries with it the coiling sleeve 33 and the pins 31 thereby twisting the barb-forming wires about the line wires.

The main drive shaft 37 is suitably journaled in the machine frame 1 and is operated by a source of power such as an electric motor 5. The motor shaft 6 projects from each end of the motor. One end has fixed thereto a sprocket 7 (see Figure 1) which is connected to and drives a similar sprocket 8 on the main drive shaft 37 by means of a chain 9. The opposite end of the motor shaft is connected to a drive shaft 76 which drives the twisting and coiling unit to be described hereafter.

In order to leave barb ends projecting beyond the line wires the number of turns which the pins 31 make in contact with the barb-forming wires 17 is limited by withdrawing the coiling sleeve 33 axially along the wire guide 14 when a sufficient number of turns of the barb-forming wires 17 have been completed.

In order to withdraw the coiling sleeve 33, there is provided a yoke 38 mounted in an annular groove 39 in the enlarged end of the coiling sleeve 33. The yoke 38 is fastened to a slide plate 40 slidable on a roller housing **40*a* which is mounted on the frame 16 of the machine. The slide plate 40 is movable in slots in the roller housing 40*a* from left to right, viewing Figure 5, and is caused to reciprocate in the slots by means of a cam wheel 41 mounted on the main drive shaft 37. The nature of this cam wheel is readily apparent from Figure 5 and a further description is not deemed necessary other than to point out that it has two opposed cam faces which have their high points 180° apart on opposite sides of the cam wheel. A pair of resilient rollers 42 mounted for rotation on the underside of the slide plate 40 act as cam followers and bear on opposite sides of the cam wheel 41. This insures positive action of the slide plate 40** with no lag in its reciprocating action thereby providing positive control of the barb-forming pins and the barb-forming operation.

When the barb-forming wires have been twisted about the line wires they are severed at the wire guides **29*a*. A second shear plate 43 is accordingly provided on a vertically movable housing or cutter block 44 to cooperate with the upper guide plate 29 in cutting the wire. The end of the second shear plate 43 which passes adjacent the end of the upper guide plate 29 is preferably of the same angle as the end of the upper guide plate 29. The cutter block is mounted in vertical guides 45 formed by guide blocks 46** which limit the movement of the cutter block to the vertical up-and-down direction, viewing Figure 4.

Vertical movement of the cutter block 44 is imparted by an eccentric sleeve 47 which is keyed to the drive shaft 37 and passes through a bushing 48 in the cutter block or housing 44.

A rack 49 is fastened to the bottom of the cutter block 44 and cooperates with the pinion segment **22*a* to drive the ratchet wheel 22*b* and thereby the feed rolls 18 which feed the barb-forming wire. When the cutter block moves upwardly in the vertical direction the rack 49 carries the pinion segment 22*a* and its accompanying spring-loaded ratchet dog 22*c* over the ratchet wheel 22*b* in the counterclockwise direction, viewing Figure 5. On the downward return movement of the cutter block the ratchet dog 22*c* engages the teeth of the ratchet wheel 22*b* and turns it and the shaft 22** in the clockwise direction, viewing Figure 5.

*Advancing the wire*

Figures 7, 8:
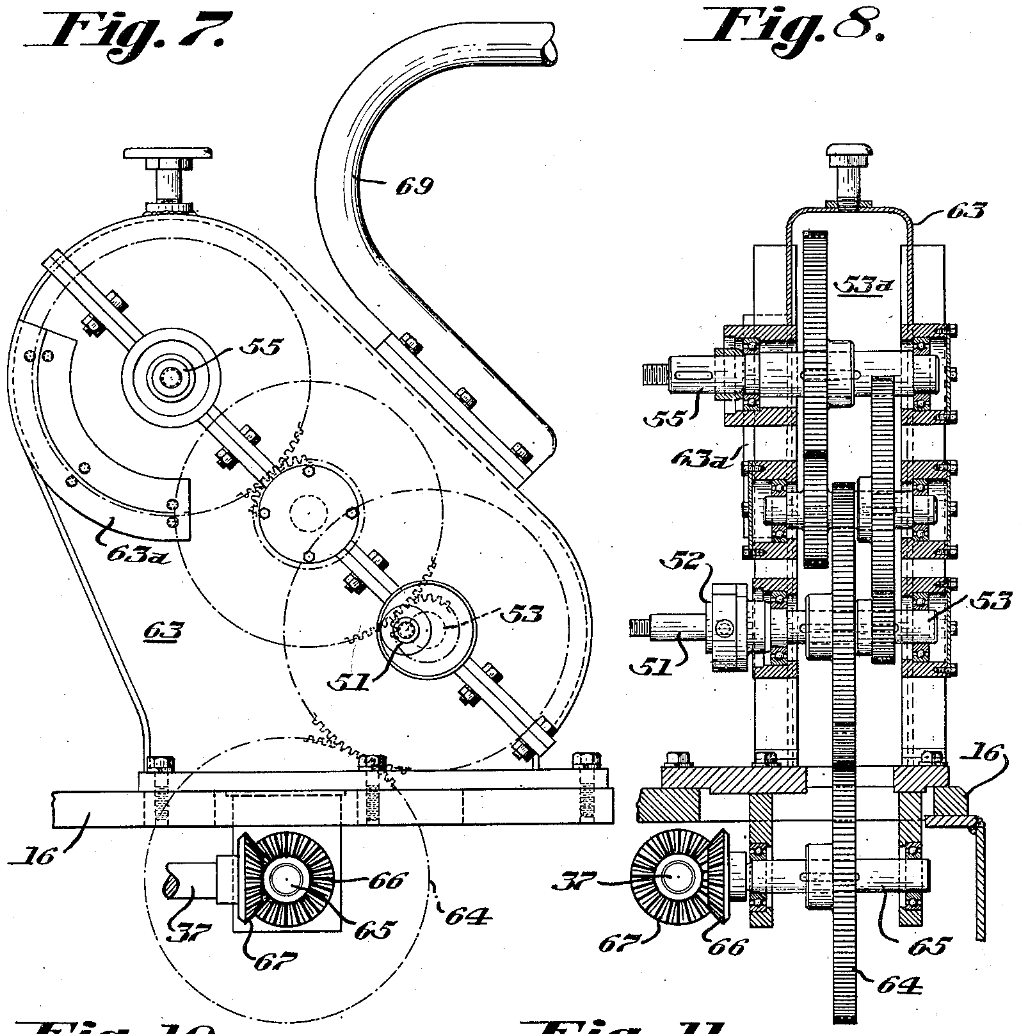
Figure 7 is a somewhat diagrammatic elevational view in an enlarged figure of the gear arrangement in the wire take-up and gripping mechanism.
Figure 8 is an enlarged view partly in elevation and partly in section showing the gear arrangement in the wire take-up and the wire-gripping mechanism.
Figures 10, 11, 12:
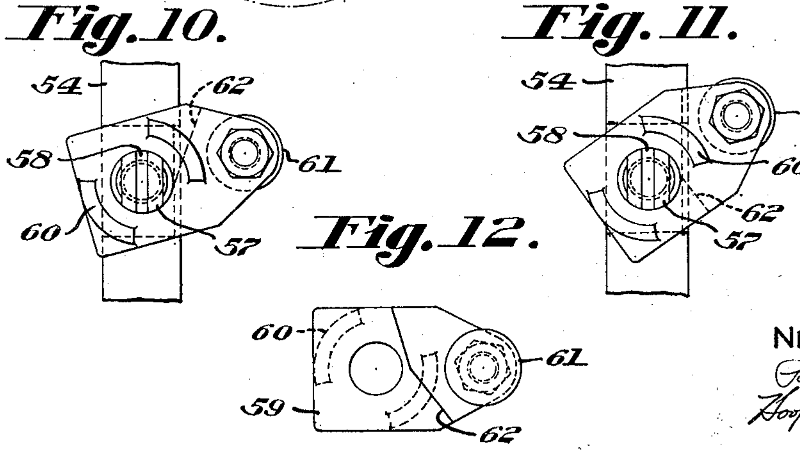
Figure 10 is a top plan view of the wire-gripping mechanism of Figure 9 in position to receive the wire.
Figure 11 is a top plan view of the same wire-gripping and guiding mechanism showing it in gripping position.
Figure 12 is a bottom plan view of the gripping bracket.

After a barb has been formed on the line wires, the line wires are advanced to bring them into position to form the next barb. This is accomplished by the slack take-up and transfer wheels shown in Figures 6, 7 and 8 of the drawings. The line wires, leaving the barb-forming position of the machine, pass to a slack take-up wheel 50 and then to a wire-gripping and transfer wheel 54.

The slack take-up wheel includes a hub portion **50*a* and a plurality of forked wire-engaging members 50*b* spaced apart around the circumference of the hub and extending radially outwardly therefrom. The slack take-up wheel is mounted for rotation on a shaft 51 fastened to a sliding block 52 adjustably positioned in a guide member 52*a* mounted on the end of a shaft 53. The relative position of the block 52 and thereby the eccentric position of shaft 51 with respect to shaft 53 is adjusted by means of a screw 52*b* journaled in the ends of the guide member 52*a* and threadingly engaging the sliding block 52. The adjustability of the eccentric position of shaft 51 with respect to shaft 53 makes it possible to change the distance between the barbs on the line wires as hereafter more fully described. The shaft 53 is driven through a gear train 53*a* from the main drive shaft 37. The slack take-up wheel thus rotates freely about the shaft 51, and the shaft 51 being on the end of the eccentric 52 rotates in a circle about the axis of the shaft 53**.

A wire-gripping and transfer wheel 54 takes the line wires with the barbs attached thereto from the slack take-up wheel and advances them at a substantially continuous rate of speed. The wire-gripping wheel 54 is mounted on a shaft 55 which is driven by the same gear train **53*a* which drives the shaft 53 carrying the slack take-up wheel 50. The gripping wheel 54 is provided with gripping members 56** spaced apart around its circumference.

The gripping members 56 are made up of a wire guide 57 which is firmly fastened to the outer periphery of the gripping wheel. Each wire guide 57 is provided with a slot 58 in the direction of travel of the line wires. A roller bracket 59 is mounted for rotation about each wire guide 57. Each roller bracket has a pair of upstanding fingers or segments of a cylinder 60 forming a wire-receiving slot therebetween normally in line with the slot in the wire guide 57. Both the slots 58 in the wire guide 57 and the segmental portions 60 of the roller brackets 59 have sloping edges leading into the slots through which the line wires pass. There sloping edges guide the wires into the slots of the wire guide and roller bracket. A cam roller 61 is mounted on the roller bracket 59. The cam roller cooperates with cam surfaces 63a on the housing 63 surrounding the gear train 53a which drives the gripping wheel 54 and the slack take-up wheel 50. As the wire leaves the take-up wheel it enters the slots 58 in the wire guide 57 between the fingers 60 of the roller bracket. As the gripping wheel 54 rotates the cam roller 61 contacts the cam surface 63a causing the roller bracket 59 and the fingers 60 to rotate about the wire guide 57, thereby locking the line wires between the upstanding fingers 60 and the slot 58. The rotation of the roller brackets about the wire guides 57 is limited by an off-set portion or shoulder 62 which engages the gripping wheel and limits the rotation of the roller bracket about the wire guide. This prevents excessive deformation of the wire in the wire guide.

The gear train 53a which drives the take-up wheel 50 and the gripping wheel 54 is driven by a spur gear 64 mounted on a shaft 65 journaled for rotation at right angles to the drive shaft 37. A bevel gear 66 is fixed on one end of the shaft 65 for engagement with a bevel gear 67 on the end of the drive shaft 37.

The gripping wheel 54 rotates continuously to take wire from the take-up wheel 50. The take-up wheel 50 is likewise in constant motion following a circular path about the axis of the driven shaft 53. When the take-up wheel leaves the extreme left-hand position, viewing Figures 1 and 6, it carries with it the line wires and a newly-formed barb. The forward movement of the wire continues until the take-up wheel reaches the extreme right-hand position, viewing Figures 1 and 6. As the take-up wheel returns to the extreme left-hand position, following its circular or orbital path about the shaft 53, it creates slack in the line wires which the gripper wheel takes up. At the same time the line wires stop or "dwell" at the barb-forming station during which "dwell" the next barb is formed. If the eccentric position of the adjustable block 52 is changed the distance between the barbs is changed by a proportionate amount. The barb distance will be greater or smaller depending upon whether the block 52 is moved further from or nearer to the axis of the shaft 53.

*Twisting and coiling the wire*

The line wires with barbs affixed thereto pass from the gripping wheel 54 to an idler sheave or pulley 68 which is mounted on the end of a telescopic supporting arm 69. The supporting arm 69 is adjustable so that the wires are delivered substantially on the center line of the twisting and coiling mechanism shown in detail in Figures 13 and 14 and described hereafter.

A hollow mandrel 70 is journaled at each end in thrust bearings 71 and 72 mounted in a surrounding bearing cartridge 73. The mandrel is rotatable about a vertical axis. A miter gear 74 is fixed to the lower end of the mandrel 70 for engagement with a second miter gear 75 connected to a drive shaft 76 extending from a source of power such as an electric motor 5 whereby to rotate the mandrel 70.

A flange 77 projects from the periphery of the hollow mandrel near its upper end. A disk or bedplate 78 is bolted to the flange 77. A tubular yoke 79 is fixed to the disk 78 near its outer edges and projects vertically above the disc. Both the disc 78 and the yoke 79 rotate with the mandrel 70. A second disc 78a is fixed to the yoke 79 above the disc 78 to form a working surface.

A bushing 80 surrounds the outer periphery of the mandrel at its upper end and is held in place by a cap ring 81 fixed to the top of mandrel and an outer surrounding ring 82 which has an inwardly projecting flange 83 which projects beneath the bushing 80. A circular table 84 is fixed to the top of the ring 82 and a ring gear 85 is bolted to a flange 86 surrounding the ring 82 intermediate its ends. Thus the circular table 84 is movable independently of the mandrel and the disc and yoke.

A bearing housing 87 is mounted on the disk 78 which supports the yoke 79. A hollow shaft 90 having a pinion gear 91 at its upper end is journaled in the bearing housing 87. A cap screw 92 passes through the center of the hollow shaft 90 and is fixed to a holding plate 92a below the bearing housing 87. A spur gear 93 is freely mounted for rotation about an upstanding flange 92b on the holding plate 92a with the cap screw 92 as its axis. A spring 94 surrounds the upper end of the cap screw 92 and tends to urge the gear 93 against a friction disc 95 held in a back-up plate 95a. Both the holding plate 92a and the back-up plate 95a are keyed to the hollow shaft 90. The gear 91 at the upper end of the hollow shaft 90 meshes with the ring gear 85 surrounding the ring 82. The gear 93 meshes with a ring gear 96 mounted on the bearing cartridge 73 which surrounds the hollow mandrel. This arrangement provides a differential drive between the mandrel 70 and the supporting table 84.

A spool arbor 97 is rotatably and slidably mounted inside the hollow mandrel 70 for reciprocal movement in the vertical direction. A bronze bushing 98 fixed in an annular groove 99 separates the spool arbor from the internal wall of the hollow mandrel and permits free movement, both rotary and reciprocally, of the arbor within the hollow mandrel.

The spool arbor is in general a cylindrical tube from which two 90° segments have been removed along its axis to leave two projecting fingers 100 which enter a wire spool 101 to engage and drive it.

The circular turntable 84 has a pair of slots 102 and 103 corresponding to the section of the fingers 100 and through which the fingers pass as the arbor is reciprocated in the mandrel.

A shaft 104 is journaled for rotation at one end in a ring 105 fixed to the bottom of the spool arbor. The opposite end of the shaft 104 passes through an opening in the bottom of the hollow mandrel and is connected to a hydraulic cylinder 106 which reciprocates the spool arbor within the mandrel.

A hub 107 and spool cover 108 are fixed to a shaft 109 above the table 84. The shaft 109 is journaled for rotation in bearings 110 mounted on the yoke. The spool cover is of a size sufficient to engage the end of a wire spool upon which the barbed wire is wound.

A traversing sheave or butterfly 111 is mounted on a shaft 112 which is attached to the yoke and the disc 78. In order to balance the rotating members which make up the twisting and coiling unit, the traversing sheave 111 and shaft 112 are mounted on the side of the yoke opposite to the friction drive which includes the hollow shaft 90, pinion gear 91 and pinion gear 93 which drive the circular table 84.

Figure 13:
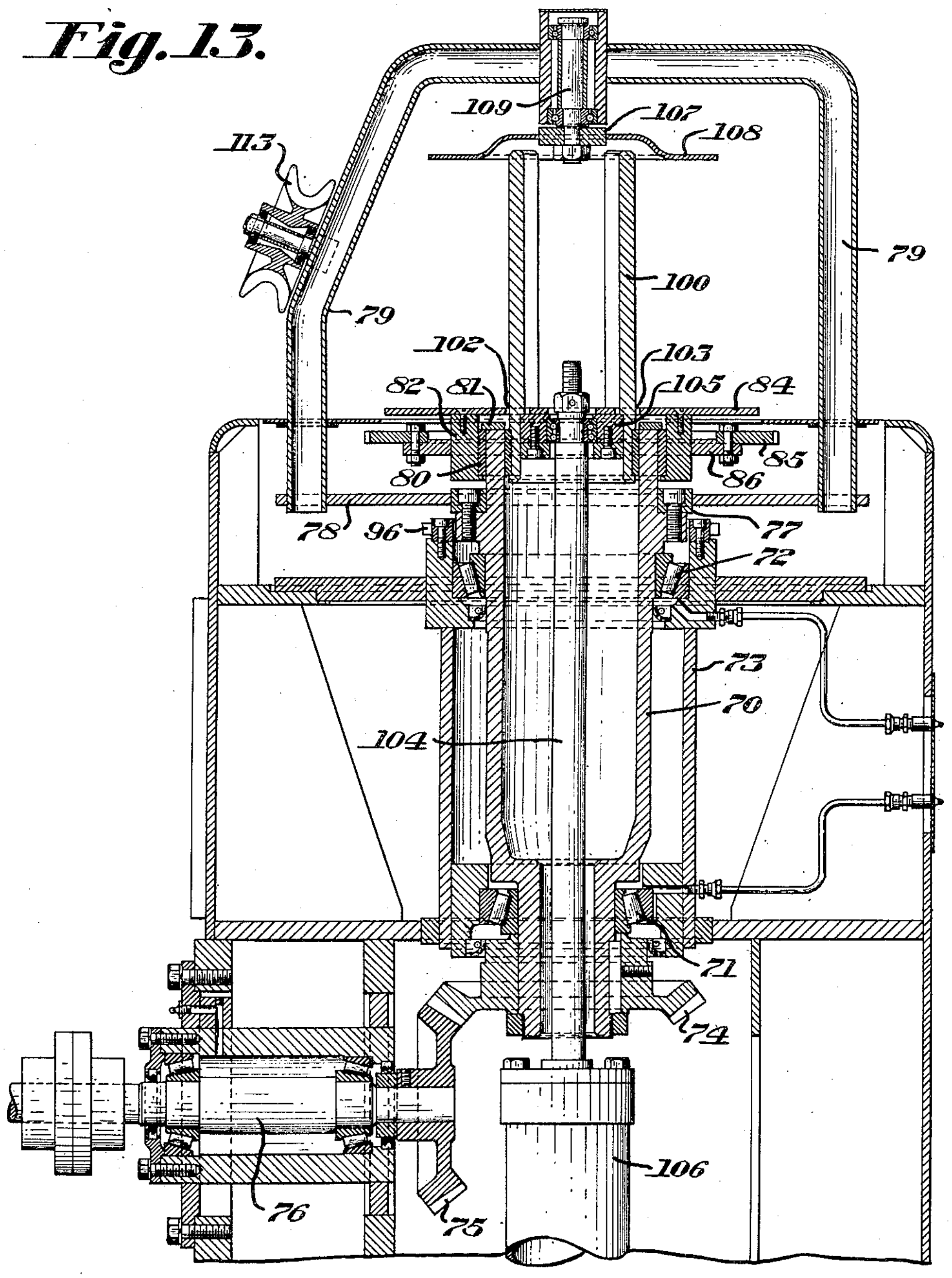
Figure 13 is a section through the twisting and coiling mechanism on the line XIII—XIII of Figure 2.
Figure 14:
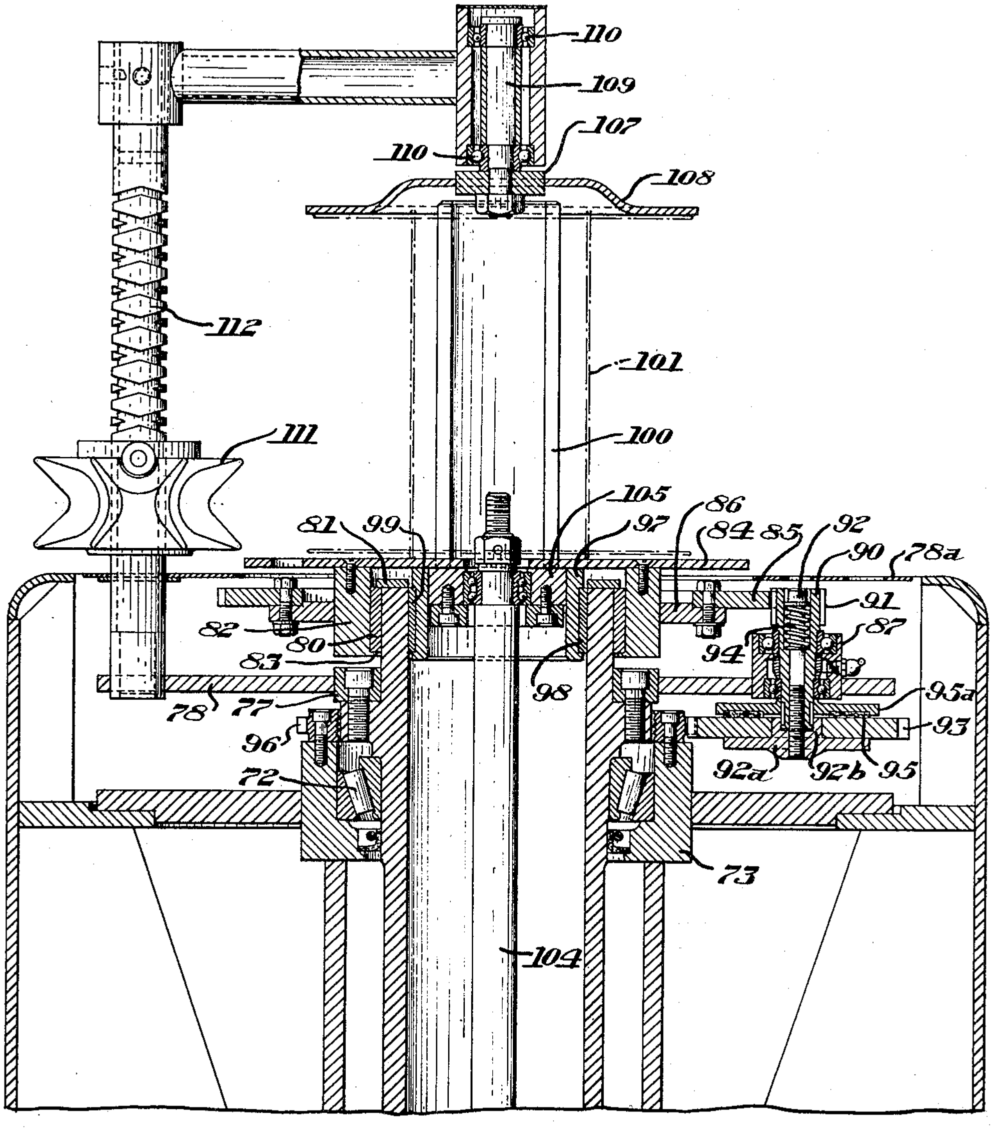
Figure 14 is a section through which wire-twisting and coiling mechanism on the line XIV—XIV of Figure 2.
Figures 15, 16:
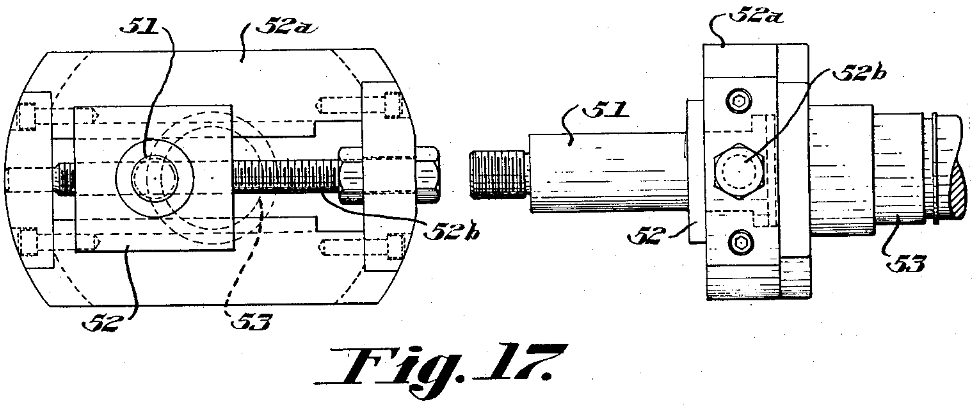
Figure 15 is an elevational view of the adjusting mechanism of the wire take-up wire.
Figure 16 is a section and elevation of the adjusting mechanism shown in Figure 15.
Figure 17:
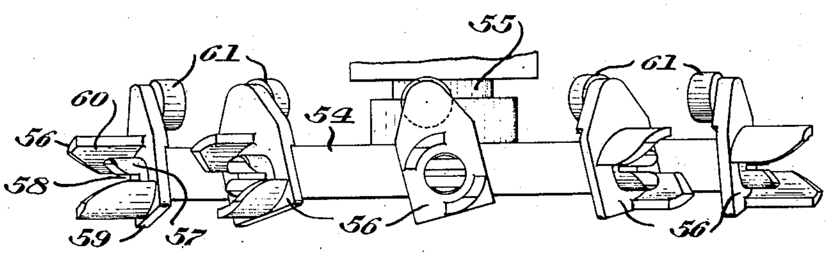
Figure 17 is a top plan view of the wire-gripping wheel.
Figure 18:
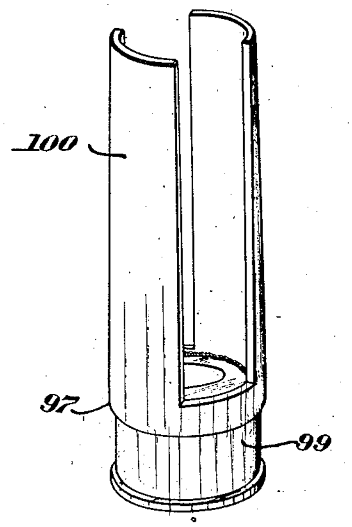
Figure 18 is a perspective showing of the spooling engaging arbor used in the wire-coiling mechanism shown in section in Figures 13 and 14.

The line wires coming from the wire-gripping and transfer wheel 54 pass over the idler sheave 68 on the axis of rotation of the mandrel 70 to a second idler sheave 113 which is mounted on the yoke 79 (see Figure 13). The line wires then pass to the traversing sheave 111 which delivers them to the wire spool 101 in level wind arrangement.

While the line wires are passing from the idler sheave 68 the hollow mandrel 70 is constantly rotating about its axis, carrying with it the disc 78, the yoke 79 and the traversing shaft 112 and sheave 111 and 113. The rotation of the mandrel and yoke causes the line wires to be twisted one about the other. While the mandrel 70 and yoke 79 are rotating to twist the line wires, the bearing housing 87 carrying hollow shaft 90 and pinions 91 and 93 is rotating about the same axis. The pinion gear 93 is driven by the fixed ring gear 96 and in turn drives the pinion 91 through the holding plate 92a, the friction disc 95, back-up plate 95a and hollow shaft 90. The rotating pinion 91 drives the ring gear 85 which is attached to the turntable 84 through the flange 86 and ring 82. Rotation of the turntable 84 causes the spool arbor 97 to rotate within the hollow mandrel 70 and about the shaft 104 because of the fact that the fingers 100 of the spool arbor project through slots 102 and 103 in the turntable. Rotation of the turntable 84 and spool arbor 97 causes rotation of the wire spool 101 and consequently coiling of the twisted barbed wire delivered from the traversing sheave 111.

The arrangement of the pinions 91 and 93, the hollow shaft 90, the spring-loaded screw 92 and the friction disc 95 and back-up plate 95*a* permits the speed of the spool arbor and turntable to vary as the diameter of the spool or coil of wire changes. In short, as the diameter of the spool of wire increases the friction disc permits a corresponding increase in slippage at the friction disc and consequently a higher speed of rotation of the turntable and spool arbor.

When the wire spool has accumulated the desired amount of twisted barbed wire thereon the hydraulic cylinder is actuated to withdraw the fingers 100 from the wire spool into the hollow mandrel and thus release the wire spool for removal from the machine. At the same time the turntable 84 drops until it contacts the cap ring at the top of the hollow mandrel 70 thereby releasing the wire spool from contact with the spool cover 108.

After the full spool of twisted and coiled wire is removed, an empty wire spool is placed on the turntable 84, the hydraulic cylinder is actuated to lift the fingers 100 through the slots in the turntable and through the wire spool and to raise the turntable 84 to hold the wire spool between the turntable surface and the spool cover 108.

The turntable 84 is preferably placed at average working height and a conveyor (not shown) for carrying away the completed spools of wire is brought to a point adjacent the turntable and at substantially the same height. The completed spools can thus be removed from the turntable and placed on the conveyor without loss of time or handling costs.

While I have shown and described a present preferred embodiment of the invention and have described a present preferred method of practicing the same, it is to be understood that the invention is not limited thereto but may be otherwise embodied and practiced within the scope of the following claims.

I claim:

1. Twisting and coiling mechanism comprising a yoke rotatable about a vertical axis, means for continuously delivering material to be twisted and coiled to a point in line with the axis of the yoke, a coiling member rotatable within the coaxial with the yoke receiving and holding a spool for coiled material, means on the yoke receiving the wire from the delivery means and directing it to the coiling member, and drive means and connections between the drive means and the yoke and coiling member whereby the yoke and coiling member are rotated to twist the material and coil it upon the spool held by the coiling member.

2. Twisting and coiling mechanism comprising a bedplate rotatable about a vertical axis, a yoke mounted on the bedplate and rotatable therewith about the same vertical axis, means for continuously delivering material to be twisted and coiled to a point in line with the axis of the bedplate, a coiling member rotatable within and coaxial with the bedplate receiving and holding a spool for coiled material, and drive means and connections between the drive means and bedplate and coiling member simultaneously rotating the bedplate and coiling member whereby the material is twisted and coiled upon the spool in the coiling member.

3. Twisting and coiling mechanism comprising a bedplate rotatable about a vertical axis, a yoke mounted on the bedplate and rotatable therewith about the same vertical axis, means for continuously delivering material to be twisted and coiled to a point in line with the axis of the bedplate, a coiling member independently rotatable within and coaxial with the bedplate and yoke, said coiling member including an axially retractable mandrel for holding a wire spool, a hub means mounted on the yoke and rotatable coaxially therewith and a second hub means surrounding the mandrel and movable therewith to a point above the level of the bedplate to hold a spool in engagement with the first hub, means on the yoke receiving the wire from the delivery means and directing it to the coiling member, and drive means and connections between the drive means and the yoke and coiling member whereby the material from the delivery means is twisted and coiled upon a spool on the coiling member.

4. Twisting and coiling mechanism comprising a bedplate rotatable about a vertical axis, a yoke mounted on the bedplate and rotatable therewith about the same vertical axis, means for continuously delivering material to be twisted and coiled to a point in line with the axis of the bedplate, drive means and connections between the drive means and the bedplate through which the bedplate is rotated, a coiling member rotatable in and axial with the bedplate and yoke, said coiling member including an axially retractable mandrel having a segmental arbor at one end thereof receiving a spool, a hub member mounted on the frame and rotatable coaxially therewith, a second hub means in an opening in the bedplate, openings in the second hub through which the segmental portions of the arbor pass, means on the arbor for raising the second hub above the level of the bedplate when the arbor is in spool-holding position, and means on the bedplate for driving the second hub whereby the material from the delivery means is twisted and coiled upon the spool on the coiling member.

5. Twisting and coiling mechanism comprising a bedplate rotatable about a vertical axis, a yoke mounted on the bedplate and rotatable therewith about the same vertical axis, means for continuously delivering material to be twisted and coiled to a point in line with the axis of the bedplate, a coiling member independently rotatable within and coaxial with the bedplate, said coiling member including an axially retractable arbor for holding a wire spool, means for extending and retracting the arbor, said arbor means being divided into two spaced apart axially extending segments, a hub means mounted on the yoke and rotatable coaxially therewith, the second hub means in an opening in the bedplate, openings in said second hub through which the segments of the arbor pass to engage the spool, means on the arbor for raising the second hub above the level of the bedplate to force the ends of the spool into engagement with the hubs, drive means and connections through which the bedplate is rotated, and means on the bedplate causing the arbor and hub to rotate simultaneously with the rotating bedplate and frame at a speed different from the speed of the bedplate, said means including friction means between the bedplate and the hub and arbor whereby their relative speeds may vary as the diameter of the wire on the spool varies.

6. Twisting and coiling mechanism comprising a bedplate rotatable about a vertical axis, a yoke mounted on the bedplate and rotatable therewith about the same vertical axis, means for continuously delivering material to be twisted and coiled to a point in line with the axis of the bedplate, drive means and a hollow drive shaft connecting the drive means to the bedplate, a coiling member independently rotatable within and coaxial with the bedplate and yoke, said coiling member including axially retractable arbor within the hollow drive shaft, means for advancing and retracting said arbor, said arbor having spaced apart projecting fingers engaging a spool upon which wire is to be coiled, hub means freely rotatably mounted on the yoke coaxially therewith, turntable means rotatable in an opening in the bedplate, said turntable means having a flange portion surrounding the upper end of the hollow drive shaft and movable axially thereon, stop means limiting the movement of said turntable and flange, openings in the turntable means receiving the spaced apart arbor fingers, means on the arbor for moving the turntable axially of the drive shaft to engage a spool between the hub means and the turntable means, drive means and connections through which the hollow drive shaft is rotated, friction drive means from the hollow drive shaft to the turntable means and the arbor whereby the relative speeds of the drive shaft and arbor may vary as the diameter of the wire on the spool varies, and distribution means on the frame movable parallel to the axis of rotation of the frame directing the material to be coiled onto the spool.

7. A mechanism for making barbed wire comprising cam means intermittently advancing line wires lengthwise in generally parallel relationship, means intermittently advancing other wires transversely to the line wires in timed relation to the intermittent advance of said line wires so that the forward movement of said line wires is stopped during at least a portion of the dwell of the transverse wires, said means for advancing the transverse wires including a pair of feed rolls at one side of the path of travel of the line wires, connections from said rolls to a shaft extending transversally of the path of travel of the line wires, a ratchet wheel on said shaft, a segmental pinion mounted for rotation on said shaft adjacent the ratchet wheel, pawl means on the segmental pinion engaging the ratchet wheel, cutting means spaced from the line wires for cutting said transverse wires, rack means on the cutting means moving the segmental pinion and ratchet wheel to rotate said rolls at the completion of the cutting operation, twisting means for twisting the transverse wires about at least one of the line wires during the time the wires are stopped, said twisting means being advanceable and retractable along the path of travel of the line wires to engage and disengage the transverse wires whereby to control the turns of transverse wires about the line wires, a plurality of spaced apart slotted gripping members rotatable about the circumference of a circle, the plane of which includes the line of travel of said line wires, said gripping members receiving the line wires from the cam means intermittently advancing the line wires, cam means on the gripping members opening and closing the slots therein about the line wires to continuously and positively advance said line wires, a yoke rotatable about a vertical axis transverse to the line of travel of the line wires, a coiling member rotatable within and coaxially with the yoke, said coiling member including a retractable mandrel for holding a wire spool, means on the yoke receiving the wire from the gripping means and directing it to the coiling member, drive means actuating the means intermittently advancing the line wires and connections between the drive means and the yoke and coiling member simultaneously rotating the yoke and coiling member whereby the wire from the gripping means is twisted and coiled on a spool on a mandrel of the coiling member.

8. A mechanism for making barbed wire comprising cam means intermittently advancing line wires lengthwise in generally parallel relationship, means intermittently advancing other wires transversely to the line wires in timed relation to the intermittent advance of said line wires so that the forward movement of said line wires is stopped during at least a portion of the time during which the transverse wires are stopped, said means for advancing the transverse wires including a pair of feed rolls at one side of the path of travel of the line wires, connections from said rolls to a shaft extending transversally of the path of travel of the line wires, a ratchet wheel on said shaft, a segmental pinion mounted for rotation on said shaft adjacent the ratchet wheel, pawl means on the segmental pinion engaging the ratchet wheel, cutting means spaced from the line wires for cutting said transverse wires, rack means on the cutting means moving the segmental pinion and ratchet wheel to rotate said rolls at the completion of the cutting operation, twisting means for twisting the transverse wires about at least one of the line wires during the time the wires are stopped, said twisting means being advanceable and retractable along the path of travel of the line wires to engage and disengage the transverse wires whereby to control the turns of transverse wires about the line wires, a plurality of spaced apart slotted gripping members rotatable about the circumference of a circle, said gripping members receiving the line wires from the cam means intermittently advancing the line wires the plane of which includes the line of travel of said line wires, cam means on the gripping members opening and closing the slots therein about the line wires to continuously and positively advance said line wires, and twisting and coiling means rotatable about a common vertical axis receiving the wire from the gripping members, whereby to twist the line wires one about another and subsequently to coil the twisted wires upon the spool said coiling means including a platform vertically movable on the axis of rotation of the twisting and coiling means to engage a spool receiving completed wire from the twisting and coiling means.

References Cited in the file of this patent

UNITED STATES PATENTS

| | | |
|---|---|---|
| 187,306 | Peacock | Feb. 13, 1877 |
| 313,741 | King | Mar. 10, 1885 |
| 365,723 | Bates | June 28, 1887 |
| 387,710 | Crecelius | Aug. 14, 1888 |
| 479,985 | Kilmer | Aug. 2, 1892 |
| 519,633 | Kilmer | May 8, 1894 |
| 608,471 | Miller | Aug. 2, 1898 |
| 689,712 | Emery | Dec. 24, 1901 |
| 711,303 | Frederick | Oct. 14, 1902 |
| 739,244 | Williams | Sept. 15, 1903 |
| 740,220 | Billstrom | Sept. 29, 1903 |
| 785,652 | Bates | Mar. 21, 1905 |
| 899,542 | Kitselman | Sept. 29, 1908 |
| 902,152 | Kilmer | Oct. 27, 1908 |
| 1,320,856 | Hesjedal | Nov. 4, 1919 |
| 1,663,615 | Schmid | Mar. 27, 1928 |
| 1,821,730 | Sommer | Sept. 1, 1931 |
| 2,330,611 | Nelson | Sept. 28, 1943 |
| 2,541,746 | Cochran | Feb. 13, 1951 |
| 2,554,253 | Kiehl | May 22, 1951 |
| 2,633,692 | MacCreadie | Apr. 7, 1953 |
| 2,673,578 | Getz | Mar. 30, 1954 |
| 2,681,084 | Sommerville | June 15, 1954 |

FOREIGN PATENTS

| | | |
|---|---|---|
| 682,383 | Great Britain | Nov. 12, 1952 |